US012767543B2

(12) United States Patent
Yogendra et al.

(10) Patent No.: US 12,767,543 B2
(45) Date of Patent: Oct. 20, 2026

(54) PHOSGENE SYNTHESIS BY CONVERSION OF A GAS MIXTURE CONTAINING CHLORINE AND CARBON MONOXIDE ON AN ORGANIC CATALYST CONTAINING CHLORIDE ANIONS

(71) Applicant: Covestro Deutschland AG, Leverkusen (DE)

(72) Inventors: Sivathmeehan Yogendra, Düsseldorf (DE); Sebastian Hasenstab-Riedel, Berlin (DE); Patrick Vossnacker, Berlin (DE); Rainer Weber, Odenthal (DE); Yuliya Schiesser, Troisdorf (DE); Simon Steinhauer, Berlin (DE); Thomas Keilhack, Berlin (DE)

(73) Assignee: Covestro Deutschland AG, Leverkusen (DE)

( * ) Notice: Subject to any disclaimer, the term of this patent is extended or adjusted under 35 U.S.C. 154(b) by 613 days.

(21) Appl. No.: 18/256,475

(22) PCT Filed: Dec. 13, 2021

(86) PCT No.: PCT/EP2021/085547

§ 371 (c)(1),
(2) Date: Jun. 8, 2023

(87) PCT Pub. No.: WO2022/128950

PCT Pub. Date: Jun. 23, 2022

(65) Prior Publication Data

US 2024/0025753 A1 Jan. 25, 2024

(30) Foreign Application Priority Data

Dec. 14, 2020 (EP) .................................... 20213938

(51) Int. Cl.
*C01B 32/80* (2017.01)

(52) U.S. Cl.
CPC .................................... *C01B 32/80* (2017.08)

(58) Field of Classification Search
CPC ...................................................... C01B 32/80
See application file for complete search history.

(56) References Cited

FOREIGN PATENT DOCUMENTS

| | | | | | |
|---|---|---|---|---|---|
| CN | 101735112 | A | | 6/2010 | |
| CN | 111151297 | A | | 5/2020 | |
| DE | 3327274 | A1 | | 2/1985 | |
| DE | 102004041777 | A1 | | 3/2006 | |
| WO | 2006029788 | A1 | | 3/2006 | |
| WO | WO-2012130803 | A1 | * | 10/2012 | ............. B01D 53/68 |

OTHER PUBLICATIONS

International Search Report, PCT/EP2021/085547, date of mailing: Mar. 17, 2022, Authorized officer: Sevillano Rodriguez.

* cited by examiner

*Primary Examiner* — Deborah D Carr
(74) *Attorney, Agent, or Firm* — Donald R. Palladino

(57) ABSTRACT

The invention relates to a method for producing phosgene, comprising at least the steps of: a) bringing a gas mixture containing carbon monoxide and chlorine into contact with a catalyst, the catalyst containing at least one ionic organic compound which contains monochloride anions and, on contact with chlorine, forms an ionic organic compound containing polychloride anions; b) converting the gas mixture into phosgene on the catalyst. With the invention, phosgene can be produced using less activation energy and in high yields without the use of conventional activated carbon catalysts.

20 Claims, No Drawings

PHOSGENE SYNTHESIS BY CONVERSION OF A GAS MIXTURE CONTAINING CHLORINE AND CARBON MONOXIDE ON AN ORGANIC CATALYST CONTAINING CHLORIDE ANIONS

CROSS-REFERENCE TO RELATED APPLICATION

This application is a national stage application under 35 U.S.C. § 371 of PCT/EP2021/085547, filed Dec. 13, 2021, which claims the benefit of European Application No. 20213938.2, filed Dec. 14, 2020, each of which is incorporated herein by reference.

FIELD

The invention relates to a method for producing phosgene and to compositions which are used in the method according to the invention and in the embodiments thereof.

BACKGROUND

Phosgene is usually produced industrially by reacting chlorine gas and carbon monoxide gas at elevated temperatures (over a specific activated carbon catalyst).

The conversion of chlorine gas and carbon monoxide proceeds according to the following equilibrium reaction:

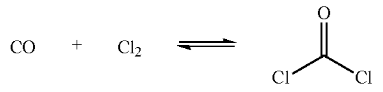

With increasing temperature, the equilibrium reaction shifts in favor of the reactants. It was therefore the object of the present invention to provide a method for the formation of phosgene at low temperatures.

The conversion of chlorine gas and carbon monoxide necessarily requires the use of an additional activated carbon catalyst. For this purpose, on an industrial scale, custom-made tubular reactors (diameter: 40-80 mm), typically laboriously filled with activated carbon, are used. It was therefore an object of the present invention to develop a method for the formation of phosgene for the direct further processing of phosgene that does not require such an activated carbon catalyst.

If smaller amounts of phosgene, i.e. less than 10 kg, are to be used, for example for chemical reactions with phosgene as reactant on a laboratory scale and this phosgene is to be produced directly by means of phosgene synthesis on a laboratory scale, the conventional synthetic routes via reaction of chlorine gas with carbon monoxide over the activated carbon catalyst have proven to be too costly and therefore impractical. It was therefore an object of the present invention to provide a method for the formation of phosgene, also for direct further processing in amounts on a laboratory scale.

The production of phosgene, which is usually carried out on the activated carbon catalyst, requires the supply of activation energy to initiate the reaction. The object was to provide a method for producing phosgene which requires a reduced initial energy supply and in which, ideally even at 20° C., the reaction of $Cl_2$ and carbon monoxide starts to form phosgene. Furthermore, the object was to increase the efficiency of the equilibrium reaction for increased formation of the phosgene product.

In patent application WO 2012/130803 A1, it has been described that specific ionic liquids are suitable as chlorine gas absorbers, which can remove excess chlorine from a crude product of a synthesis in a work-up step of a synthetic process in a rectification column. The absorbed chlorine gas is to be expelled (stripped) by introducing an additional gas, for example carbon monoxide, wherein the gas mixture obtained after the chlorine gas has been expelled, for example a mixture of $Cl_2$ and carbon monoxide, is to be fed to a classical phosgene synthesis and converted there.

SUMMARY

It has now been found that the reaction of a gas mixture containing carbon monoxide and chlorine ($Cl_2$ is hereinafter referred to as "chlorine") with at least one monochloride anion-containing compound ($Cl^-$ is hereinafter referred to as monochloride anion) according to the method described below provides a direct preparation method of phosgene, which achieves the objects previously cited.

The present invention is therefore a method for preparing phosgene, comprising at least the steps of a) bringing a gas mixture containing carbon monoxide and chlorine into contact with a catalyst, wherein the catalyst comprises at least one ionic, monochloride anion-containing organic compound, which forms an ionic, polychloride anion-containing organic compound on contact with chlorine, b) converting the gas mixture to phosgene over the catalyst.

DETAILED DESCRIPTION

A "reaction chamber" is a volume in which the co-reactants taking part in a chemical reaction are brought together and in which the chemical reaction takes place. For a chemical reaction, for example, this can be the volume of a vessel in which said catalyst and the reactants, in this case carbon monoxide and chlorine, are located together.

A "reaction zone" is the part of the reaction chamber in which the chemical reaction takes place.

According to the invention, a "catalyst" is understood to mean a substance which catalyzes the reaction of carbon monoxide and chlorine to form phosgene.

A substance (or a composition) is "liquid" if it is in the liquid state at 20° C. and 1013 mbar. A substance (or a composition) is "solid" if it is in the solid state at 20° C. and 1013 mbar. A substance (or a composition) is "gaseous" if it is present as a gas at 20° C. and 1013 mbar.

A substance is "organic" if its chemical structure comprises at least one covalent carbon-hydrogen bond.

Those skilled in the art understand polychloride anion as the anion $[Cl_n]^-$ with n greater than 1.

The method according to the invention is carried out in such a way that the ionic, monochloride anion-containing organic compound and the mixture containing carbon monoxide and chlorine gas are already converted into a phosgene-containing product as a result of the contact. The reaction procedure is preferably carried out in such a way that said catalyst is initially charged in a reaction chamber and said gas mixture containing carbon monoxide and chlorine gas is introduced into the reaction chamber in such a way that chemical conversion of the chlorine gas and carbon monoxide to phosgene takes place over said catalyst in the reaction chamber. It is thereby observed that said catalyst lowers the activation energy of the reaction of carbon monoxide and chlorine and thereby increases the reaction rate without being consumed in the reaction and without appearing in the end product.

In step a) of the method according to the invention, a catalyst containing at least one ionic, monochloride anion-containing organic compound is used.

When carrying out the method according to the invention, the catalyst may be dissolved in a liquid composition during contact with said gas mixture, or may be present as a solid. According to a preferred embodiment, the catalyst is dissolved in a liquid composition or is present as a solid at 20° C. and 1013 mbar.

Said catalyst may itself be in the form of a solid and/or supported on a solid support. In the context of the method according to the invention, if said catalyst is present supported on a solid support, this is considered to be a catalyst in the form of a solid for the purposes of the invention. Suitable solid supports are the support materials familiar to those skilled in the art of heterogeneous catalysis, such as metals, inorganic oxide (in particular selected from metal oxide (such as titanium dioxide aluminate)), ceramic supports (such as silicate (e.g. layered silicate, zeolite), borate, phosphate), organic polymer. The catalyst can be sorbed onto the support, in particular absorbed, adsorbed or covalently bound to a support (for example organic polymer, for example based on polyammonium-based chloride anion exchange resins (e.g. Amberlite (Amberlite IRA-900))) by chemisorption.

In the context of the method according to the invention, if said catalyst is present in the form of a solid on contact with said gas mixture, it can be used in the method according to the invention in the form of a fixed bed or in the form of a suspension in a liquid composition.

The catalyst preferably comprises at least one ionic, monochloride anion-containing organic compound, the cation of which is selected from the group of one or more cations (preferably each substituted by different alkyl and/or aryl groups) selected from ammonium, phosphonium, sulfonium, pyrrolidinium, piperidinium, imidazolium, pyridinium or guanidinium cations or mixtures thereof (preferably from the group of ammonium cations or phosphonium cations each substituted by different alkyl and/or aryl groups) and the monochloride anion ($Cl^-$) thereof. Preference is given here to using cations substituted by different alkyl and/or aryl groups, in which the heteroatom formally bearing the cationic charge is present asymmetrically alkyl- and/or aryl-substituted. Alkyl substitution in the context of the invention is in particular substitution by $C_1$- to $C_6$-alkyl-, preferably $C_1$- to $C_3$-substituents (methyl, ethyl, n-propyl and isopropyl-substitution); aryl substitution is in particular substitution by $C_5$- to $C_6$-aryl substituents. The aryl substituents may optionally comprise various heteroatoms such as oxygen, sulfur, nitrogen, fluorine or chlorine.

Particular preference is given, in turn, to said at least one ionic, monochloride anion-containing organic compound of the catalyst, characterized in that it comprises as cation at least one cation selected from:

1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-5-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimidazolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2,3-dimethylimidazolium, 1-tetradecyl-3-methylimidazolium, 2,3-dimethylimidazolium, 2-ethyl-3,4-dimethylimidazolium, 3,4-dimethylimidazolium, trimethylsulfonium, triethylsulfonium, diethylmethylsulfonium, ethyldimethylsulfonium, methyl(diphenyl)sulfonium, ethyl(diphenyl)sulfonium, triphenylsulfonium, tris(4-tert-butylphenyl)sulfonium, 1-butyl-1-methylpyrrolidinium, 1-propyl-1-methylpyrrolidinium, 1-propyl-1-ethylpyrrolidinium, 1-ethyl-1-methylpyrrolidinium, 1-diethylpyrrolidinium, 1-dimethylpyrrolidinium, 1-butyl-1-methylpiperidinium, 1-propyl-1-methylpiperidinium, 1-propyl-1-ethylpiperidinium, 1-ethyl-1-methylpiperidinium, 1-diethylpiperidinium, 1-dimethylpiperidinium, 1,2-dimethylpyridinium, 1-butyl-2-ethyl-6-methylpyridinium, 1-butyl-2-ethylpyridinium, 1-butyl-2-methylpyridinium, 1-butyl-3,4-dimethylpyridinium, 1-butyl-3,5-dimethylpyridinium, 1-butyl-3-ethylpyridinium, 1-butyl-3-methylpyridinium, 1-butyl-4-methylpyridinium, 1-butylpyridinium, 1-ethylpyridinium, 1-hexyl-3-methylpyridinium, 1-hexyl-4-methylpyridinium, 1-hexylpyridinium, 1-methylpyridinium, 1-octylpyridinium, 2-ethyl-1,6-dimethylpyridinium, 2-ethyl-1-methylpyridinium, 4-methyl-1-octylpyridinium, 1,1-dimethylpyrrolidinium, 1-butyl-1-ethylpyrrolidinium, 1-butyl-1-methylpyrrolidinium, 1-ethyl-1-methylpyrrolidinium, 1-ethyl-3-methylpyrrolidinium, 1-hexyl-1-methylpyrrolidinium, 1-octyl-1-methylpyrrolidinium, guanidinium, hexamethylguanidinium, N,N,N',N'-tetramethyl-N"-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium, triisobutyl(methyl)phosphonium, tetramethylammonium, tetraethylammonium, tetrapropylammonium, tetrabutylammonium, butyltrimethylammonium, methyltrioctylammonium, octyltrimethylammonium, tetrabutylammonium, tetrapropylammonium, tetraethylammonium, tetramethylammonium, triethylmethylammonium, ethyltrimethylammonium, diethyldimethylammonium, tripropylmethylammonium and/or tributylmethylammonium.

A method was found to be particularly suitable in which said catalyst comprises at least one ionic organic compound of the general formula (I) and/or (II), preferably at least one ionic compound of the general formula (I), as the ionic, monochloride anion-containing organic compound of the catalyst, $$[N-R1_m R2_n R3_o]^+ Cl^- \qquad (I)$$

-continued $$[P{-}R4_pR5_q]^+Cl^-, \quad (II)$$

where, in formulae (I) and (II), the radicals R1, R2, R3, R4, and R5 are each independently identical or different alkyl radicals selected from the group of: methyl, ethyl, n-propyl, isopropyl, n-butyl, isobutyl and 2-methylpropyl, preferably methyl, ethyl, isopropyl or n-propyl, where the characters m, n, o, p, and q are each independently an integer in the series from 0 to 4 and where the sum of m+n+o and the sum of p+q must in each case result in the value 4.

More preferably, according to formulae (I) and (II), restrictively at least one radical R1, R2 or R3 is different from the respective other radicals R1, R2 and R3 and the radicals R4 and R5 are different from each other. Here, if this restriction is selected, such compounds of the formulae (I) and/or (II) are more preferably suitable if, according to the general formula (I), the symbols m are 1, 2 or 3, n is 1, 2 or 3 and o is zero, where m+n+o=4.

In the context of a further embodiment of the method according to the invention, it has proven to be particularly suitable, for example for use in a fixed bed, that at least one ionic organic compound selected from $NMe_4Cl$, $NEtMe_3Cl$, $NEt_2Me_2Cl$, $NEt_3MeCl$, $Et_4NCl$, or mixtures thereof is selected as the ionic, monochloride anion-containing organic compound of the catalyst.

Solid catalysts which may be used by way of preference comprise at least one ionic, monochloride anion-containing organic compound, which is solid at 20° C. and 1013 mbar, selected from $Me_4NCl$, $Et_4NCl$, $Me_3SCl$ or $Pr_4NCl$. These catalysts are in turn preferably used unsupported in the method according to the invention.

When carrying out the method according to the invention, said catalyst forms, at least as an intermediate, an ionic, polychloride anion-containing organic compound from said gas mixture on contact with chlorine. This in turn reacts with carbon monoxide in said gas mixture to form phosgene with degradation of the polychloride anion, for example to monochloride anion. Therefore, while carrying out the method according to the invention, the catalyst comprises at least one of said ionic, polychloride anion-containing organic compounds.

In the context of a further embodiment of the invention, it has been shown to be advantageous if the method according to the invention is characterized in that the catalyst forms at least one polychloride anion-containing compound by contact with chlorine from step a), the cation of which is selected from the group of one or more different alkyl- and/or aryl-substituted cations selected from ammonium, phosphonium, sulfonium, pyrrolidinium, piperidinium, imidazolium, pyridinium or guanidinium cations or mixtures thereof (preferably from the group of ammonium cations or phosphonium cations substituted in each case by different alkyl and/or aryl groups) and the polychloride anion of which is $[Cl_{(r+2)}]^-$, in which r is an odd integer from 1 to 7, preferably 1 or 3. In the context of the invention, alkyl substitution is in particular substitution by $C_1$- to $C_6$-alkyl-, preferably $C_1$ to $C_3$-substituents (methyl, ethyl, n-propyl and isopropyl substitution); aryl substitution is in particular substitution by $C_5$- to $C_6$-aryl substituents. The aryl substituents may optionally comprise various heteroatoms such as oxygen, sulfur, nitrogen, fluorine or chlorine.

It is preferred in accordance with the invention if the cation of said monochloride anion-containing compound is selected from the group of one or more cations, in each case substituted by different alkyl and/or aryl substituents, selected from ammonium, phosphonium, sulfonium, imidazolium, pyrrolidinium, piperidinium, pyridinium or guanidinium cations or mixtures thereof and the polychloride anion $[Cl_{(r+2)}]^-$ is present, in which r is an odd integer from 1 to 7, preferably 1 or 3.

Said cation is particularly preferably selected from the group of ammonium cations or phosphonium cations each substituted by different alkyl and/or aryl groups.

Potentially suitable as cations for said polychloride anion-containing compound of the novel method are the following simple cations, some of which are known from literature, from the list:

1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-5-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimidazolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2,3-dimethylimidazolium, 1-tetradecyl-3-methylimidazolium, 2,3-dimethylimidazolium, 2-ethyl-3,4-dimethylimidazolium, 3,4-dimethylimidazolium, trimethylsulfonium, triethylsulfonium, diethylmethylsulfonium, ethyldimethylsulfonium, methyl(diphenyl)sulfonium, ethyl(diphenyl)sulfonium, triphenylsulfonium, tris(4-tert-butylphenyl)sulfonium, 1-butyl-1-methylpyrrolidinium, 1-propyl-1-methylpyrrolidinium, 1-propyl-1-ethylpyrrolidinium, 1-ethyl-1-methylpyrrolidinium, 1-diethylpyrrolidinium, 1-dimethylpyrrolidinium, 1-butyl-1-methylpiperidinium, 1-propyl-1-methylpiperidinium, 1-propyl-1-ethylpiperidinium, 1-ethyl-1-methylpiperidinium, 1-diethylpiperidinium, 1-dimethylpiperidinium, 1,2-dimethylpyridinium, 1-butyl-2-ethyl-6-methylpyridinium, 1-butyl-2-ethylpyridinium, 1-butyl-2-methylpyridinium, 1-butyl-3,4-dimethylpyridinium, 1-butyl-3,5-dimethylpyridinium, 1-butyl-3-ethylpyridinium, 1-butyl-3-methylpyridinium, 1-butyl-4-methylpyridinium, 1-butylpyridinium, 1-ethylpyridinium, 1-hexyl-3-methylpyridinium, 1-hexyl-4-methylpyridinium, 1-hexylpyridinium, 1-methylpyridinium, 1-octylpyridinium, 2-ethyl-1,6-dimethylpyridinium, 2-ethyl-1-methylpyridinium, 4-methyl-1-octylpyridinium, 1,1-dimethylpyrrolidinium, 1-butyl-1-ethylpyrrolidinium, 1-butyl-1-methylpyrrolidinium, 1-ethyl-1-methylpyrrolidinium, 1-ethyl-3-methylpyrrolidinium, 1-hexyl-1-methylpyrrolidinium, 1-octyl-1-methylpyrrolidinium, guanidinium, hexamethylguanidinium, N,N,N',N'-tetramethyl-N''-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium, triisobutyl(methyl) phosphonium, tetramethylammonium, tetraethylammonium, tetrapropylammonium, tetrabutylammonium, butyltrimethylammonium, methyltrioctylammonium, octyltrimethylammonium, tetrabutylammonium, tetrapropylammonium, tetraethylammonium, tetramethylammonium, triethylmethylammonium, ethyltrimethylammonium, diethyldimethylammonium, tripropylmethylammonium and/or tributylmethylammonium.

In the context of one embodiment of the invention, the method according to the invention is characterized in that the catalyst from step a) comprises at least one polychloride anion-containing compound of the formula (III) or the formula (IV) or a mixture thereof by the contact with chlorine, $$[N-R^1_m R^2_n R^3_o]^+[Cl_{(r+2)}]^- \quad \text{(III)}$$

$$[P-R^4_p R^5_q]^+[Cl_{(s+2)}]^- \quad \text{(IV)}$$

in which the radicals $R^1$, $R^2$, $R^3$, $R^4$ and $R^5$ are each independently identical or different alkyl radicals selected from the group of: methyl, ethyl, n-propyl, isopropyl, n-butyl, isobutyl and 2-methylpropyl, preferably methyl, ethyl, or n-propyl, m, n, o, p, and q are each independently an integer in the series from 0 to 4 and where the sum of m+n+o and the sum of p+q must result in the value 4, where r and s are each independently an odd integer from 1 to 7, preferably r and s are each independently 1 or 3.

Here, a method according to the invention was shown to be particularly effective in which, according to formulae (III) and (IV), restrictively, at least one radical R1, R2 or R3 is different from the respective other radicals R1, R2 and R3 and the radicals R4 and R5 are different from each other.

Preferred compounds of the formula (III) or (IV) are selected from at least one compound of the series: $NMe_4Cl$, $NEt_4Cl$, $Pr_4NCl$, $NEtMe_3Cl_{(r+2)}$, $NEt_2Me_2Cl_{(r+2)}$, $NEt_3MeCl_{(r+2)}$, $NBuEt_2MeCl_{(r+2)}$, $NMePr_3Cl_{(r+2)}$, $NBu_2Me_2Cl_{(r+2)}$, $PEt_3MeCl_{(r+2)}$, where the abbreviations Me, Et, Pr, Bu are methyl, ethyl, n-propyl and n-butyl, in which r is an odd integer from 1 to 7, preferably 1 or 3. Here, in turn, those compounds from the aforementioned series are preferred which are asymmetrically substituted at the nitrogen atom of the cation.

Particularly preferred methods according to the invention are characterized in that the compound of the formula (III) is selected in particular from at least one compound of the series: $NEtMe_3Cl_{(r+2)}$, $NEt_2Me_2Cl_{(r+2)}$, $NEt_3MeCl_{(r+2)}$, $NMe_4Cl$, $NEt_4NCl_{(r+2)}$ in which r is an odd integer from 1 to 7, preferably 1 or 3.

In the context of one embodiment, liquid components (at 1013 mbar and 20° C.) comprising catalyst having at least one said monochloride anion-containing compound, are used in step a) in the method according to the invention.

To provide this liquid, catalyst-containing component of step a), preference is given to the use of liquid, organic solvents as a liquid composition in which said monochloride anion-containing compound can be incorporated, to obtain a solution or dispersion.

Likewise, in step a) of the method according to the invention, at least one solid monochloride anion-containing compound and, in addition, a liquid composition in contact therewith can be provided in the form of a liquid phase (for example in the reaction chamber). According to the invention, a "phase" is understood to mean a substance or a substance mixture which is in contact with another substance or substance mixture and forms a phase boundary. A phase boundary is a term for surfaces that separate two phases that are not mixed with each other; for example, the separating surfaces between the liquid-solid, liquid-liquid, solid-solid, solid-gas, or liquid-gas phases. Further embodiments of corresponding steps of the method according to the invention, in which liquid compositions containing organic solvents act as a solvent for said monochloride anion-containing compound of step a) or as a dispersant for said monochloride anion-containing compound of step a), are described in more detail later.

In step b) of the method according to the invention, the gas mixture of carbon monoxide and chlorine is reacted over the catalyst to obtain phosgene (preferably in the reaction chamber).

The reaction of chlorine and carbon monoxide in step b) proceeds particularly effectively if at most 20 mol %, preferably at most 10 mol %, especially preferably at most 5 mol %, most preferably at most 1 mol %, of said compounds having monochloride anions are used as catalyst of step a), based on the amount of phosgene formed. A possible catalyst support is not taken into account in this calculation.

For the reaction of the carbon monoxide to form phosgene in step b) of the method according to the invention, it has proven to be particularly suitable if the gas mixture in step a) has a molar ratio of carbon monoxide and chlorine (i.e. amount of carbon monoxide divided by amount of chlorine) of at least 1, preferably greater than 1, particularly preferably greater than 1.25, especially preferably greater than 1.5.

Usually, phosgene production by means of classical phosgene synthesis requires temperatures of up to 500° C. to provide the necessary energy. A disadvantage here is the reverse reaction of phosgene to chlorine and carbon monoxide, which is preferred at elevated temperatures. Therefore, in a preferred embodiment of the invention, step b) is carried out at temperatures <500° C., preferably <250° C., more preferably <150° C., particularly preferably at <100° C., further preferably <80° C., especially preferably <50° C., most preferably <30° C.

The bringing of the gas mixture containing carbon monoxide and chlorine into contact with said catalyst which takes place in step a) can be carried out by direct introduction of said gas mixture into a liquid phase containing said catalyst, for example via a nozzle or a tube or a frit. The gaseous carbon monoxide can also be introduced into the reaction chamber as a gaseous phase without passing through said liquid phase. In the case that said catalyst is solid and is used in the form of a fixed bed, it is preferred if said gas mixture is present as a gas stream which flows around the catalyst. For example, the solid catalyst may be used in a tubular reactor or in a fluidized bed.

In the context of one embodiment of the invention, step a) can be carried out in such a way that the amount of carbon monoxide provided for the reaction is fed into a reaction chamber in such a way that an increase in pressure is caused in the reaction chamber. Consequently, one embodiment of the method according to the invention provides that before step a), said gas mixture is introduced into a reaction chamber so that the internal pressure of the reaction chamber is higher than atmospheric pressure, and said gas mixture is brought into contact with said catalyst. It is also advantageous to select the contact time of said gas mixture with said catalyst accordingly until a pressure drop in the reaction chamber can no longer be registered.

A further embodiment of the method according to the invention provides that the amount of said gas mixture provided for the reaction is introduced into a reaction chamber and brought into contact with said catalyst, wherein the gas phase present in the reaction chamber is circulated as a gas stream and, after being discharged from the reaction chamber, is repeatedly introduced into the reaction chamber.

Likewise, for a reaction, a stream of said gas mixture can be introduced into a reaction chamber and brought into contact with said catalyst and residual gas can be discharged from the reaction chamber without being recirculated to the reaction chamber, it being preferable in this flow of said gas mixture through the reaction chamber if the phosgene formed in step b) either remains in the reaction chamber or is removed from the reaction chamber and collected.

In general, the process according to the invention may provide for the phosgene formed in step b) to remain in the reaction chamber or for the phosgene to be discharged from the reaction chamber.

In the case that the phosgene remains in the reaction chamber, one embodiment of the method according to the invention is characterized in that the phosgene formed in step b) passes into the gas phase and remains in the reaction chamber during the conversion of said gas mixture over said catalyst.

A further embodiment of the method according to the invention can provide for a transition of the phosgene into the gas phase, in which case this phosgene in the gas phase is then removed from the reaction chamber and collected outside the reaction chamber, for example by condensation of the phosgene or by dissolving the phosgene in a liquid composition containing liquid solvent. In principle, all organic liquid solvents that do not react with phosgene at 1013 mbar and 20° C. are suitable for this purpose, such as aliphatic hydrocarbons, aromatic hydrocarbons, in particular an organic solvent such as toluene, 1,2-dichlorobenzene, 1,4-dichlorobenzene, monochlorobenzene, fluorobenzene, 1,2-difluorobenzene, dichloromethane or mixtures thereof. A preferred method according to the invention is thus characterized in that the phosgene formed in step b) is removed from the reaction chamber and the phosgene formed in step b) contained therein is collected outside the reaction chamber, preferably by condensation or by dissolving in an organic solvent.

However, it is equally the case according to the invention in which the phosgene remains in the reaction chamber and is taken up in a liquid composition containing organic solvent. Thus, a method according to the invention is preferred in which the phosgene formed in step b) is dissolved in a liquid composition containing organic solvent and thereby collected, said liquid composition being in the reaction chamber. It is advantageous if said liquid composition is already in the reaction chamber during the reaction in step b) and is in contact with said catalyst comprising at least one said monochloride anion-containing compound. In this case, the liquid composition may form a phase boundary with the catalyst or said catalyst is dissolved therein. In order to reduce evaporation of the phosgene formed and to increase retention of the phosgene in the liquid composition, said liquid organic composition may be cooled to 0 to 10° C.

The phosgene formed in the reaction in step b) can pass directly into the organic solvent-containing liquid composition (optionally in the form of a liquid phase) and be collected. One embodiment of the method according to the invention is consequently characterized in that at least one organic solvent is present in the liquid composition (especially in the liquid phase), in which phosgene dissolves at 20° C. and 1013 mbar to an extent of at least 1 g/L, preferably dissolves to an extent of at least 100 g/L, particularly preferably dissolves to an extent of at least 250 g/L.

Consequently, preference is given to a method according to the invention in which in step b), in addition to said catalyst comprising at least one monochloride anion-containing compound, a liquid phase containing organic solvent is additionally present, said liquid phase being in contact with said catalyst. In the context of this embodiment, the choice of solvent is such that the amount of monochloride anion-containing compound used does not dissolve completely in the organic solvent. For this purpose, it proved advantageous to select said liquid phase such that the monochloride anion-containing compound dissolves therein, at 20° C. and 1013 mbar, to an extent of less than 0.1 g/L, in particular to an extent of less than 0.01 g/L.

Liquid compositions containing an organic solvent which does not react chemically with polychloride anion-containing compounds, especially under the reaction conditions selected in the method according to the invention (e.g. with respect to pressure and temperature), i.e. a solvent which is inert to polychloride anion-containing compounds, have proven to be particularly suitable. It has therefore proven to be preferable if said organic solvent is aprotic. An "aprotic solvent" is understood by those skilled in the art to mean those liquid, organic compounds as such having low $E_T^N$ values (0.0-0.4; $E_T^N$=normalized values of the empirical solvent polarity parameters as defined in: Reichardt, C., *Solvents and Solvent Effects in Organic Chemistry,* 3rd edition; Wiley VCH: Weinheim, (2003)).

Particularly preferred organic solvents are selected from aprotic, organic compounds comprising at least one halogen atom selected from chlorine and fluorine, in particular 1,2-dichlorobenzene, 1,4-dichlorobenzene, monochlorobenzene, fluorobenzene, 1,2-difluorobenzene, dichloromethane or mixtures thereof.

The phosgene formed by the method according to the invention in step b) can be reacted in said reaction chamber with at least one phosgene-reactive component. It is preferred if the phosgene-reactive component is an organic compound, preferably at least one organic alcohol or at least one organic amine, in particular at least one organic compound having at least two hydroxyl groups or at least one organic compound having at least two amino groups, particularly preferably at least one organic diol or at least one organic diamine.

In carrying out step b) of the method according to the invention, a composition having two or more phases is used, which is also an object of this invention. The composition present in step b) in the reaction chamber is a composition having at least two phases, comprising as the first phase a gas mixture containing carbon monoxide and chlorine, and a catalyst-containing phase different therefrom, which comprises at least one ionic, monochloride anion-containing organic compound which forms an ionic, polychloride anion-containing organic compound on contact with chlorine.

With increasing reaction time, there is an increase in the phosgene content, particularly in the first phase, so that a composition preferred according to the invention is characterized in that said composition comprises at least two phases containing, as the first phase, a gas mixture containing carbon monoxide, chlorine, phosgene, and, as a further phase different therefrom, a phase containing a catalyst having at least one ionic, monochloride anion-containing organic compound which forms an ionic, polychloride anion-containing organic compound on contact with chlorine.

In the context of one embodiment, if at least one organic solvent is used in step b) of the method according to the invention, this at least one organic solvent may be part of the aforementioned further phase (for example monochloride anion-containing component dissolves in the at least one organic solvent) or is dispersed therein. Particularly suitable is a composition having at least two phases, containing as the first phase a gas mixture containing carbon monoxide and chlorine, and as a phase different therefrom, a catalyst having at least one ionic, monochloride anion-containing organic compound, characterized in that the composition additionally comprises at least one organic solvent.

In particular, as the reaction proceeds in step b) of the method according to the invention, a composition is obtained containing phosgene, at least one ionic, organic monochloride anion-containing compound and at least one organic solvent. The phosgene present in the composition is preferably present dissolved in the at least one organic solvent, wherein the at least one ionic, organic monochloride anion-containing compound is at least partially dissolved in the at least one organic solvent. It is in turn particularly preferred if the phosgene present in the composition is present dissolved in the at least one organic solvent and forms a liquid phase, wherein the at least one ionic, organic monochloride anion-containing compound is present at least partially as a solid phase.

Embodiments of features of the method, which are also features of the composition, and preferred configurations thereof, are also embodiments or preferred configurations of the composition.

The invention further relates to the use of at least one ionic, monochloride anion-containing organic compound, which forms an ionic, polychloride anion-containing organic compound on contact with chlorine, as catalyst for converting a gas mixture containing chlorine and carbon monoxide to give phosgene.

In this context, the embodiments of the features "ionic, monochloride anion-containing organic compound which forms an ionic, polychloride anion-containing organic compound of the method on contact with chlorine" and "ionic, polychloride anion-containing organic compound", defined in the context of the method, are also embodiments or preferred configurations of use.

In the context of embodiments of the invention, the following aspects 1 to 24 may be mentioned by way of example:

1. A method for producing phosgene, comprising at least the steps of
   a) bringing a gas mixture containing carbon monoxide and chlorine into contact with a catalyst, wherein the catalyst comprises at least one ionic, monochloride anion-containing organic compound, which forms an ionic, polychloride anion-containing organic compound on contact with chlorine,
   b) converting the gas mixture to phosgene over the catalyst.
2. The method according to aspect 1, characterized in that the catalyst comprises at least one ionic, monochloride anion-containing organic compound, the cation of which is selected from the group of one or more cations (preferably each substituted by different alkyl and/or aryl groups) selected from ammonium, phosphonium, sulfonium, pyrrolidinium, piperidinium, imidazolium, pyridinium or guanidinium cations or mixtures thereof (preferably from the group of ammonium cations or phosphonium cations each substituted by different alkyl and/or aryl groups) and the monochloride anion ($Cl^-$) thereof.
3. The method according to either of aspects 1 or 2, characterized in that said ionic, monochloride anion-containing organic compound of the catalyst comprises as cation at least one cation selected from:

1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-5-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimidazolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2,3-dimethylimidazolium, 1-tetradecyl-3-methylimidazolium, 2,3-dimethylimidazolium, 2-ethyl-3,4-dimethylimidazolium, 3,4-dimethylimidazolium, trimethylsulfonium, triethylsulfonium, diethylmethylsulfonium, ethyldimethylsulfonium, methyl(diphenyl)sulfonium, ethyl(diphenyl)sulfonium, triphenylsulfonium, tris(4-tert-butylphenyl)sulfonium, 1-butyl-1-methylpyrrolidinium, 1-propyl-1-methylpyrrolidinium, 1-propyl-1-ethylpyrrolidinium, 1-ethyl-1-methylpyrrolidinium, 1-diethylpyrrolidinium, 1-dimethylpyrrolidinium, 1-butyl-1-methylpiperidinium, 1-propyl-1-methylpiperidinium, 1-propyl-1-ethylpiperidinium, 1-ethyl-1-methylpiperidinium, 1-diethylpiperidinium, 1-dimethylpiperidinium, 1,2-dimethylpyridinium, 1-butyl-2-ethyl-6-methylpyridinium, 1-butyl-2-ethylpyridinium, 1-butyl-2-methylpyridinium, 1-butyl-3,4-dimethylpyridinium, 1-butyl-3,5-dimethylpyridinium, 1-butyl-3-ethylpyridinium, 1-butyl-3-methylpyridinium, 1-butyl-4-methylpyridinium, 1-butylpyridinium, 1-ethylpyridinium, 1-hexyl-3-methylpyridinium, 1-hexyl-4-methylpyridinium, 1-hexylpyridinium, 1-methylpyridinium, 1-octylpyridinium, 2-ethyl-1,6-dimethylpyridinium, 2-ethyl-1-methylpyridinium, 4-methyl-1-octylpyridinium, 1,1-dimethylpyrrolidinium, 1-butyl-1-ethylpyrrolidinium, 1-butyl-1-methylpyrrolidinium, 1-ethyl-1-methylpyrrolidinium, 1-ethyl-3-methylpyrrolidinium, 1-hexyl-1-methylpyrrolidinium, 1-octyl-1-methylpyrrolidinium, guanidinium, hexamethylguanidinium, N,N,N',N'-tetramethyl-N"-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium, triisobutyl(methyl)phosphonium, tetramethylammonium, tetraethylammonium, tetrapropylammonium, tetrabutylammonium, butyltrimethylammonium, methyltrioctylammonium, octyltrimethylammonium, tetrabutylammonium, tetrapropylammonium, tetraethylammonium, tetramethylammonium, triethylmethylammonium, ethyltrimethylammonium, diethyldimethylammonium, tripropylmethylammonium and/or tributylmethylammonium.

4. The method according to any of the preceding aspects, characterized in that at least one ionic organic compound of the general formula (I) and/or (II), preferably at least one ionic compound of the general formula (I), is present as the ionic, monochloride anion-containing organic compound of the catalyst, $$[N{-}R1_mR2_nR3_o]^+Cl^- \quad (I)$$

$$[P{-}R4_pR5_q]^+Cl^-, \quad (II)$$

where, in formulae (I) and (II), the radicals R1, R2, R3, R4, and R5 are each independently identical or different alkyl radicals selected from the group of: methyl, ethyl, n-propyl, isopropyl, n-butyl, isobutyl and 2-methylpropyl, preferably methyl, ethyl, isopropyl or n-propyl, where the characters m, n, o, p, and q are each independently an integer in the series from 0 to 4 and where the sum of m+n+o and the sum of p+q must in each case result in the value 4.

5. The method according to aspect 4, characterized in that according to formulae (I) and (II), restrictively, at least one radical R1, R2 or R3 is different from the respective other radicals R1, R2 and R3 and the radicals R4 and R5 are different from each other.

6. The method according to aspect 5, characterized in that according to general formula (I), the symbols m are 1, 2 or 3, n are 1, 2 or 3 and o is zero, where m+n+o=4.

7. The method according to any of the preceding aspects, characterized in that at least one ionic organic compound selected from $NMe_4Cl$, $NEtMe_3Cl$, $NEt_2Me_2Cl$, $NEt_3MeCl$, $Et_4NCl$, or mixtures thereof is present as the ionic, monochloride anion-containing organic compound of the catalyst.

8. The method according to any of the preceding aspects, characterized in that the catalyst forms at least one polychloride anion-containing compound by contact with chlorine from step a), the cation of which is selected from the group of one or more different alkyl- and/or aryl-substituted cations selected from ammonium, phosphonium, sulfonium, pyrrolidinium, piperidinium, imidazolium, pyridinium or guanidinium cations or mixtures thereof (preferably from the group of ammonium cations or phosphonium cations substituted in each case by different alkyl and/or aryl groups) and the polychloride anion of which is $Cl_{(r+2)}^-$, in which r is an odd integer from 1 to 7, preferably 1 or 3.

9. The method according to any of the preceding aspects, characterized in that the catalyst from step a) comprises at least one polychloride anion-containing compound of the formula (III) or the formula (IV) or a mixture thereof by the contact with chlorine, $$[N{-}R^1_mR^2_nR^3_o]^+[Cl_{(r+2)}]^- \quad (III)$$

$$[P{-}R^4_pR^5_q]^+[Cl_{(s+2)}]^- \quad (IV)$$

in which the radicals $R^1$, $R^2$, $R^3$, $R^4$ and $R^5$ are each independently identical or different alkyl radicals selected from the group of: methyl, ethyl, n-propyl, isopropyl, n-butyl, isobutyl and 2-methylpropyl, preferably methyl, ethyl, or n-propyl, m, n, o, p, and q are each independently an integer in the series from 0 to 4 and where the sum of m+n+o and the sum of p+q must result in the value 4, where r and s are each independently an odd integer from 1 to 7, preferably r and s are each independently 1 or 3.

10. The method according to aspect 9, characterized in that according to formulae (III) and (IV), restrictively, at least one radical R1, R2 or R3 is different from the respective other radicals R1, R2 and R3 and the radicals R4 and R5 are different from each other.

11. The method according to aspect 9, characterized in that the compound of the formula (III) or (IV) is selected from at least one compound of the series: $NMe_4Cl$, $NEt_4Cl$, $Pr_4NCl$, $NEtMe_3Cl_{(r+2)}$, $NEt_2Me_2Cl_{(r+2)}$, $NEt_3MeCl_{(r+2)}$, $NBuEt_2MeCl_{(r+2)}$, $NMePr_3Cl_{(r+2)}$, $NBu_2Me_2Cl_{(r+2)}$, $PEt_3MeCl_{(r+2)}$, where the abbreviations Me, Et, Pr, Bu are methyl, ethyl, n-propyl and n-butyl, where r has the meaning defined in claim 8.

12. The method according to aspect 9, characterized in that the compound of the formula (III) is selected in particular from at least one compound of the series: $NEtMe_3Cl_{(r+2)}$, $NEt_2Me_2Cl_{(r+2)}$, $NEt_3MeCl_{(r+2)}$, $NMe_4Cl$, $NEt_4NCl_{(r+2)}$, where r has the meaning defined in claim 8.

13. The method according to any of the preceding aspects, characterized in that the catalyst is dissolved in a liquid composition or is present as a solid at 20° C. and 1013 mbar, in particular in the form of a fixed bed or in the form of a suspension in a liquid composition.

14. The method according to any of the preceding aspects, wherein at most 20 mol %, preferably at most 10 mol %, especially preferably at most 5 mol %, most preferably at most 1 mol %, of said compounds having monochloride anions are used as catalyst in step a), based on the amount of phosgene formed.

15. The method according to any of the preceding aspects, characterized in that in step a), the molar ratio of carbon monoxide and chlorine is at least 1, preferably greater than 1, particularly preferably greater than 1.25, especially preferably greater than 1.5.

16. The method according to any of the preceding aspects, characterized in that steps a) and b) are carried out at temperatures <100° C., preferably <50° C., particularly preferably <30° C.

17. The method according to any of the preceding aspects, characterized in that the phosgene formed in step b) passes into the gas phase.
18. The method according to any of the preceding claims, characterized in that the phosgene formed in step b) is collected, preferably by condensation or by dissolution in a liquid composition containing organic solvent.
19. The method according to any of the preceding aspects, characterized in that the phosgene formed in step b) is dissolved in a liquid composition containing organic solvent and thereby collected, wherein said liquid composition is in contact with the catalyst of step a).
20. The method according to either of aspects 18 or 19, characterized in that at least one organic solvent is present in the liquid composition, in which phosgene dissolves at 20° C. and 1013 mbar to an extent of at least 1 g/L, preferably to an extent of at least 100 g/L, particularly preferably to an extent of at least 250 g/L.
21. The method according to any of the preceding aspects, characterized in that the phosgene from step b) is reacted in a step c) with at least one phosgene-reactive component.
22. A composition having at least two phases, comprising as the first phase a gas mixture containing carbon monoxide and chlorine, and a catalyst-containing phase different therefrom, which comprises at least one ionic, monochloride anion-containing organic compound which forms an ionic, polychloride anion-containing organic compound on contact with chlorine.
23. The composition according to aspect 22, containing phosgene.
24. The use of at least one ionic, monochloride anion-containing organic compound, which forms an ionic, polychloride anion-containing organic compound on contact with chlorine, as catalyst for converting a gas mixture containing chlorine and carbon monoxide to give phosgene.

EXAMPLES

The following examples are given to illustrate by way of example the implementation of the teaching according to the invention, without limiting its subject matter thereto:

Example 1: Discontinuous Method in the Reactor with the Addition of o-Dichlorobenzene $[NEt_3Me]Cl$ (53 mg, 0.351 mmol, 3.5 mol %) was initially charged in a reactor, and dried to remove residual moisture. Then, 20 mL of o-dichlorobenzene was added and the resulting suspension degassed. The reactor was filled with a mixture of chlorine (700 mg, 10.009 mmol, 1 eq.) and carbon monoxide (~16 mmol, 1.6 eq.) and the reaction mixture was mixed, wherein the formation of phosgene was clearly detected by IR spectroscopy (v=3632(vw) $cm^{-1}$, 1826(s) $cm^{-1}$, 1626(w) $cm^{-1}$, 1409(vw) $cm^{-1}$, 1107(w) $cm^{-1}$, 851(vs) $cm^{-1}$ and 571(w) $cm^{-1}$). Quantitative conversion of the chlorine to phosgene was achieved.

Example 2: Discontinuous Method in a Tubular Reactor

A tubular reactor was filled with solid, fine-grained $[NEt_4]Cl$ (230 mg, 1.393 mmol). The tubular reactor was connected to a peristaltic pump and an IR spectrometer to form a circuit. The system was filled with a mixture of carbon monoxide (20.20 mmol) and chlorine gas (3.5 mmol). The gas phase was continuously pumped through the system and the gas phase was characterized by IR spectroscopy. In the IR spectra, the formation of phosgene was directly observed, evident from the steady decrease in the characteristic absorption band of carbon monoxide at 2171 $cm^{-1}$ and the increase in the absorption band characteristic of phosgene at 1682 $cm^{-1}$.

The invention claimed is:

1. A method for producing phosgene, comprising:

a) bringing a gas mixture containing carbon monoxide and chlorine in a molar ratio of carbon monoxide to chlorine of at least 1 into contact with a catalyst, wherein the catalyst comprises at least one ionic, monochloride anion-containing organic compound, which forms an ionic, polychloride anion-containing organic compound on contact with the chlorine, and b) converting the gas mixture to phosgene over the catalyst.

2. The method as claimed in claim 1, wherein the at least one ionic, monochloride anion-containing organic compound comprises a cation selected from ammonium, phosphonium, sulfonium, pyrrolidinium, piperidinium, imidazolium, pyridinium, or guanidinium or a mixture thereof and the monochloride anion ($Cl^-$) thereof.

3. The method as claimed in claim 1, wherein at least one ionic organic compound of the general formula (I) and/or (II) is present as the ionic, monochloride anion-containing organic compound of the catalyst, $$[N{-}R1_mR2_nR3_o]^+Cl^- \quad (I)$$

$$[P{-}R4_pR5_q]^+Cl^-, \quad (II)$$

where, in formulae (I) and (II), the radicals R1, R2, R3, R4, and R5 are each independently identical or different alkyl radicals selected from the group of: methyl, ethyl, n-propyl, isopropyl, n-butyl, isobutyl and 2-methylpropyl, and the characters m, n, o, p, and q are each independently an integer in the series from 0 to 4 and where the sum of m+n+o and the sum of p+q in each case results in the value 4.

4. The method as claimed in claim 3, wherein at least one radical R1, R2 or R3 is different from the other radicals R1, R2 and R3 and the radicals R4 and R5 are different from each other.

5. The method as claimed in claim 4, wherein according to general formula (I), m is 1, 2 or 3, n is 1, 2 or 3 and o is zero, and where m+n+o=4.

6. The method as claimed in claim 1, wherein at least one ionic organic compound selected from $NMe_4Cl$, $NEtMe_3Cl$, $NEt_2Me_2Cl$, $NEt_3MeCl$, $Et_4NCl$, or a mixture thereof is present as the ionic, monochloride anion-containing organic compound of the catalyst.

7. The method as claimed in claim 1, wherein the catalyst comprises a cation of which is selected from the group of one or more each differently alkyl- and/or aryl-substituted cations selected from ammonium, phosphonium, sulfonium, pyrrolidinium, piperidinium, imidazolium, pyridinium or guanidinium cations or a mixture thereof and the polychloride anion of which is $Cl_{(r+2)}^-$, in which r is an odd integer from 1 to 7.

8. The method as claimed in claim 1, wherein the catalyst comprises at least one polychloride anion-containing compound of the formula (III) or the formula (IV) or a mixture thereof by the contact with the chlorine, $$[N-R^1_m R^2_n R^3_o]^+[Cl_{(r+2)}]^- \quad \text{(III)}$$

$$[P-R^4_p R^5_q]^+[Cl_{(s+2)}]^- \quad \text{(IV)}$$

in which the radicals R1, R2, R3, R4 and R5 are each independently identical or different alkyl radicals selected from the group of: methyl, ethyl, n-propyl, isopropyl, n-butyl, isobutyl and 2-methylpropyl, m, n, o, p, and q are each independently an integer in the series from 0 to 4 and where the sum of m+n+o and the sum of p+q results in the value 4, and where r and s are each independently an odd integer from 1 to 7.

9. The method as claimed in claim 8, wherein according to formulas (III) and (IV) at least one radical R1, R2 or R3 is different from the other radicals R1, R2 and R3 and the radicals R4 and R5 are different from each other.

10. The method as claimed in claim 8, wherein the compound of the formula (III) or (IV) comprises: $NMe_4Cl$, $NEt_4Cl$, $Pr_4NCl$, $NEtMe_3Cl_{(r+2)}$, $NEt_2Me_2Cl_{(r+2)}$, $NEt_3MeCl_{(r+2)}$, $NBuEt_2MeCl_{(r+2)}$, $NMePr_3Cl_{(r+2)}$, $NBu_2Me_2Cl_{(r+2)}$, $PEt_3MeCl_{(r+2)}$, or a mixture thereof, where Me represents methyl, Et represents ethyl, Pr represents propyl, and Bu represents n-butyl.

11. The method as claimed in claim 8, wherein the compound of the formula (III) comprises at least one compound of the series: $NEtMe_3Cl_{(r+2)}$, $NEt_2Me_2Cl_{(r+2)}$, $NEt_3MeCl_{(r+2)}$, $NMe_4Cl$, $NEt_4NCl_{(r+2)}$, or a mixture thereof, where Me represents methyl and Et represents ethyl.

12. The method as claimed in claim 1, wherein, in step a), the molar ratio of carbon monoxide and chlorine is greater than 1.

13. The method as claimed in claim 1, wherein steps a) and b) are carried out at temperatures <100° C.

14. The method as claimed in claim 1, wherein the phosgene formed in step b) is collected by condensation or by dissolution in a liquid composition containing organic solvent.

15. The method as claimed in claim 1, wherein the phosgene formed in step b) is dissolved in a liquid composition containing organic solvent and thereby collected, wherein said liquid composition is in contact with the catalyst of step a).

16. The method as claimed in claim 14, wherein the organic solvent present in the liquid composition comprises an organic solvent in which phosgene dissolves at 20° C. and 1013 mbar to an extent of at least 1 g/L.

17. The method as claimed in claim 1, wherein the phosgene from step b) is reacted in a step c) with at least one phosgene-reactive component.

18. A composition having at least two phases, comprising as the first phase a gas mixture containing carbon monoxide, chlorine, and phosgene, and a catalyst-containing phase different therefrom, which comprises at least one ionic, monochloride anion-containing organic compound which forms an ionic, polychloride anion-containing organic compound on contact with the chlorine.

19. The method as claimed in claim 1, wherein, in step a), the molar ratio of carbon monoxide and chlorine is greater than 1.25.

20. A method for producing phosgene, comprising:

a) bringing a gas mixture containing carbon monoxide and chlorine into contact with a catalyst, wherein the catalyst comprises at least one ionic, monochloride anion-containing organic compound, which forms an ionic, polychloride anion-containing organic compound on contact with the chlorine, b) converting the gas mixture to phosgene over the catalyst, and c) collecting the phosgene formed in step b).

* * * * *